(12) United States Patent
Rydström et al.

(10) Patent No.: US 12,515,776 B2
(45) Date of Patent: Jan. 6, 2026

(54) MARINE DRIVE UNIT COMPRISING A CLOSED COOLING CIRCUIT

(71) Applicant: VOLVO PENTA CORPORATION, Gothenburg (SE)

(72) Inventors: Anders Rydström, Gothenburg (SE); Stig Johansson, Torslanda (SE); Lars-Gunnar Carlsson, Torslanda (SE); Stefan Johansson, Alingsås (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 568 days.

(21) Appl. No.: 18/052,014

(22) Filed: Nov. 2, 2022

(65) Prior Publication Data

US 2023/0211863 A1   Jul. 6, 2023

(30) Foreign Application Priority Data

Nov. 11, 2021 (EP) .................................... 21207773

(51) Int. Cl.
*B63H 21/38* (2006.01)
*B63H 21/17* (2006.01)
*B63H 21/21* (2006.01)

(52) U.S. Cl.
CPC ........... *B63H 21/383* (2013.01); *B63H 21/17* (2013.01); *B63H 2021/216* (2013.01)

(58) Field of Classification Search
CPC ............................... B63H 21/383; F01P 3/202
See application file for complete search history.

(56) References Cited

U.S. PATENT DOCUMENTS

| | | | |
|---|---|---|---|
| 1,822,573 | A | 9/1931 | Fitz et al. |
| 3,750,615 | A | 8/1973 | Haft et al. |
| 4,016,825 | A | 4/1977 | Pichl |
| 4,650,430 | A | 3/1987 | Schiek |

(Continued)

FOREIGN PATENT DOCUMENTS

| | | |
|---|---|---|
| CN | 106516064 B | 1/2020 |
| CN | 214524330 U | 10/2021 |

(Continued)

OTHER PUBLICATIONS

Sweden Office Action dated Apr. 3, 2023 in corresponding Sweden Patent Application No. 2251034-1, 8 pages.

(Continued)

*Primary Examiner* — Sabbir Hasan
(74) *Attorney, Agent, or Firm* — Jeffri A. Kaminski; Venable LLP

(57) ABSTRACT

A marine drive unit for a boat includes a cooling compartment arranged in a drive unit body. The cooling compartment forms part of a closed cooling circuit, where the cooling circuit is arranged to cool propulsion components of the boat, where the cooling compartment comprises an inlet opening, an inlet channel, a lower end, an outlet channel and an outlet opening, where the inlet channel forms a first flow path for a cooling fluid from the inlet opening to the lower end of the cooling compartment. The outlet channel forms a second flow path for the cooling fluid from the lower end of the cooling compartment to the outlet opening, thereby allowing heat from the cooling fluid to dissipate through the outer wall of the drive unit.

9 Claims, 6 Drawing Sheets

(56) References Cited

U.S. PATENT DOCUMENTS

| | | | |
|---|---|---|---|
| 4,747,796 | A | 5/1988 | Iwai et al. |
| 4,764,135 | A | 8/1988 | McCormick |
| 10,760,470 | B2 | 9/2020 | Li et al. |
| 11,247,761 | B1 | 2/2022 | Smith et al. |
| 2009/0235877 | A1 | 9/2009 | Cohen |
| 2010/0190392 | A1 | 7/2010 | Müller et al. |
| 2012/0028514 | A1 | 2/2012 | Grassi et al. |
| 2016/0059949 | A1 | 3/2016 | Rebele et al. |
| 2019/0249590 | A1* | 8/2019 | Li ................ H02K 5/203 |
| 2019/0300136 | A1 | 10/2019 | Nakamura |

FOREIGN PATENT DOCUMENTS

| | | |
|---|---|---|
| EP | 0590867 A1 | 4/1994 |
| EP | 1078851 A2 | 2/2001 |
| EP | 2949574 A1 | 12/2015 |
| EP | 3006326 A1 | 4/2016 |
| EP | 3279079 A1 | 2/2018 |
| EP | 3533704 A1 | 9/2019 |
| GB | 1214728 A | 12/1970 |
| GB | 1214782 A | 12/1970 |
| GB | 2563097 A | 12/2018 |
| JP | 11278379 A | 4/1981 |
| JP | H05321992 A | 12/1993 |
| JP | 2004017902 A | 1/2004 |
| JP | 2005153727 A | 6/2005 |
| JP | 2020006824 A | 1/2020 |
| JP | 2021112925 A | 8/2021 |
| NL | 8005590 A | 5/1982 |
| WO | 9741029 A1 | 11/1997 |
| WO | 2007020906 A1 | 2/2007 |
| WO | 2013072548 A1 | 5/2013 |
| WO | 2021073378 A1 | 4/2021 |
| WO | 2021121623 A1 | 6/2021 |

OTHER PUBLICATIONS

Sweden Office Action dated Apr. 3, 2023 in corresponding Sweden Patent Application No. 2251033-3, 9 pages.
Sweden Office Action dated Apr. 3, 2023 in corresponding Sweden Patent Application No. 2251032-5, 9 pages.
Sweden Office Action dated Apr. 6, 2023 in corresponding Sweden Patent Application No. 2251031-7, 9 pages.
Sweden Office Action dated Apr. 6, 2023 in corresponding Sweden Patent Application No. 2251029-1, 9 pages.
Extended European Search Report in corresponding European Application No. 21207773.9 dated May 10, 2022 (8 pages).
European Communication pursuant to Article 94(3) EPC dated Dec. 9, 2024 in corresponding European Patent Application No. 21207773.9, 6 pages.

* cited by examiner

MARINE DRIVE UNIT COMPRISING A CLOSED COOLING CIRCUIT

TECHNICAL FIELD

The present invention relates to a marine drive unit comprising a closed cooling circuit. The cooling circuit is intended to be used for cooling electric propulsion components.

BACKGROUND ART

Electric propulsion of vehicles is getting more and more common in order to replace combustible fuels. Slowly, electrical propulsion of marine vehicles are also gaining more interest. However, one drawback for boats is that the fuel economy, especially for boats travelling at higher speeds, is much lower for boats than for cars. This means that a boat must carry more batteries for the same travelled distance.

Electrical drive systems for slower boats, such as gigs or sailboats, are relatively energy efficient when the boat travels at low speeds. A further advantage for sailboats is that they normally do not need the motor, and that the motor is mostly used in emergencies and when docking. In such cases, an electric drive may be plausible.

Even though an electric motor has a high efficiency, there are some losses that are converted to heat, and that needs to be cooled away. This applies both to the electric motor, the electronic control unit and to the battery.

Combustion engines on boats are cooled by seawater that is run either through the motor or through a heat exchanger. Outboard engines are directly cooled by seawater with a water intake and a water outlet at the lower part of the engine, close to the propeller. Inboard engines provided with a sterndrive also has a water inlet and a water outlet in the sterndrive. On boats having a straight axle drive, the water inlet and the water outlet is arranged through the hull.

U.S. Pat. No. 10,760,470 B2 discloses a closed loop cooling circuit that is arranged in a housing of a supporting rod of a boat drive unit, where the housing is provided with a plurality of inlets configured for water inflow from the outside to cool the coolant in the closed loop circuit.

These cooling arrangements functions well, but there are some maintenance problems using seawater, especially salt seawater, running through the cooling system.

There is thus room for an improved cooling system.

DISCLOSURE OF INVENTION

An object of the invention is therefore to provide a marine drive unit provided with a closed cooling compartment. A further object of the invention is to provide a method for cooling a propulsion component of a marine drive unit by using a closed cooling compartment. A further object of the invention is to provide a boat comprising such a marine drive unit.

In a marine drive unit for a boat comprising a closed cooling compartment arranged in a drive unit body, where the closed cooling compartment forms part of a closed cooling circuit, where the cooling circuit is arranged to cool propulsion components of the boat, the object of the invention is achieved in that the closed cooling compartment comprises an inlet opening, an inlet channel, a lower end, an outlet channel and an outlet opening, where the inlet channel forms a first flow path for a cooling fluid from the inlet opening to the lower end of the closed cooling compartment, and where the outlet channel forms a second flow path for the cooling fluid from the lower end of the cooling closed compartment to the outlet opening, thereby allowing heat from the cooling fluid to dissipate through the outer wall of the drive unit.

By this first embodiment of the marine drive unit, the propulsion components, such as an electric motor, a battery and/or an electronic control unit can be cooled by a cooling fluid running in a closed cooling compartment in the drive unit. In this way, there is no need to bring in fresh water from the outside of the boat into the boat. This has several advantages. One advantage is that fresh water flow channels does not have to be maintained. This removes the need to clean the flow channels and to check and replace rubber gaskets etc. at the inlet openings and outlet openings. A further advantage is that the boat cannot be flooded if an inlet or outlet pipe breaks. The cooling system will also comprise less parts since a heat exchanger is not needed. A further advantage is that the flow channels in the closed cooling compartment does not have to be closed flow channels. Instead, a downward flow channel that is open at the lower end can be used, either by a fixed inner wall or an inlet tube extending to the lower part.

The cooling method will be relatively efficient since the drive unit is made of metal, preferably aluminium, which have a high thermal conductivity to the surrounding seawater. It is also possible to provide the inner walls of the flow channels with protrusions of different types, such as longitudinal fins or protrusions that will disturb the flow slightly, in order to enlarge the cooling surface for improved cooling efficiency. The closed cooling compartment may be divided into two or four flow paths with one or two internal walls.

The drive unit may be mounted on a sailboat or a smaller motorboat. Due to the closed cooling compartment and the limited size of the drive unit, the power consumption of the boat should be held at a modest level. The flow through the cooling compartment can be regulated within certain limits.

In the method for cooling electric propulsion components of a marine boat, where the marine boat comprises at least one drive unit arranged on the bottom of the boat, the steps of; feeding a cooling liquid through the propulsion components, thereby cooling the propulsion components; feeding the cooling liquid through an inlet opening of the drive unit, and downwards through an inlet channel to a lower end of the drive unit; feeding the cooling liquid upwards through an outlet channel to an outlet opening the drive unit, thereby dissipating heat from the cooling liquid to water surrounding the drive unit, and feeding the cooling liquid back to the propulsion components are comprised.

BRIEF DESCRIPTION OF DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
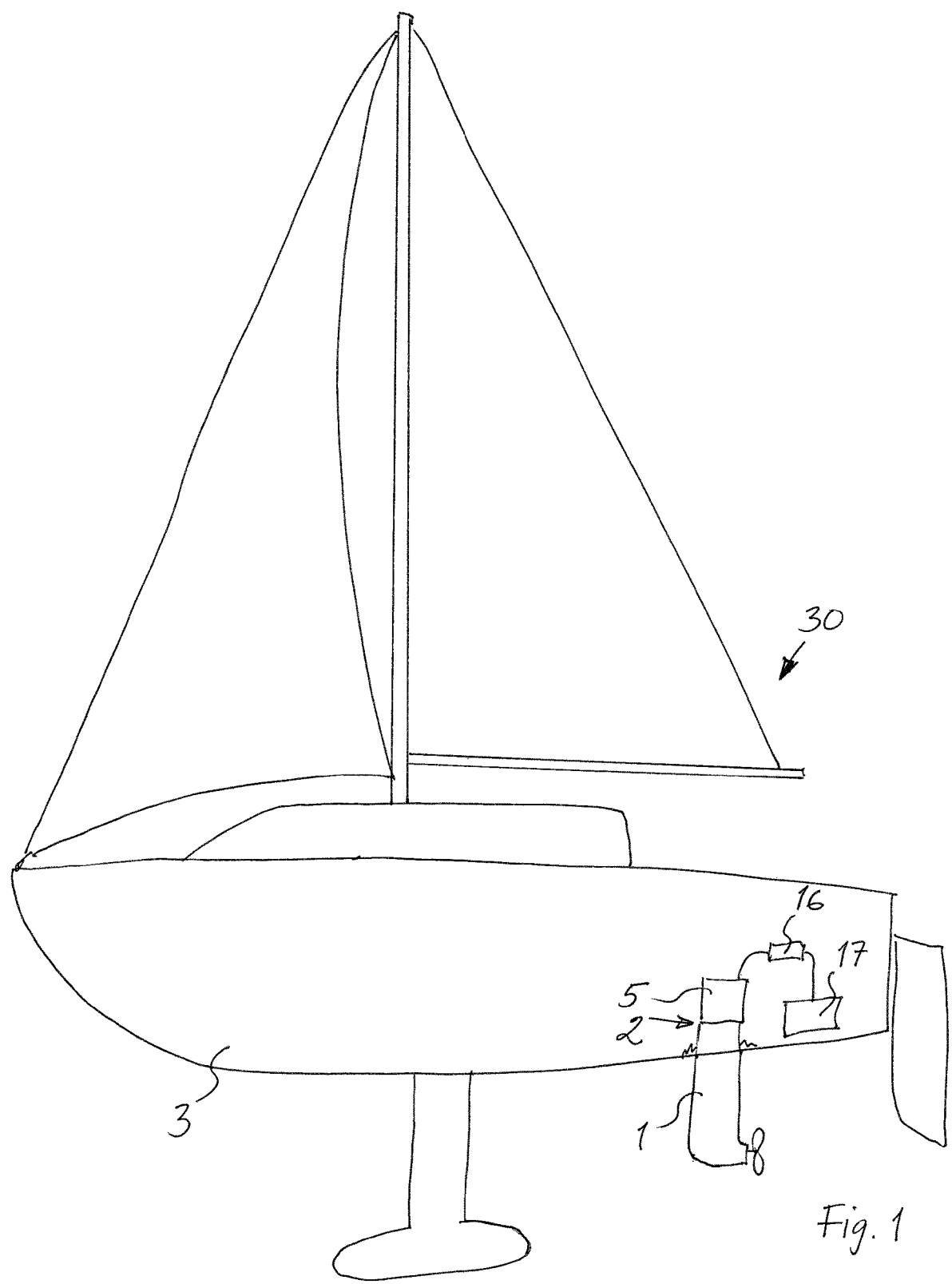
FIG. 1 shows a schematic boat provided with a drive unit according to the invention.

FIG. 1 shows a schematic boat 30 provided with a marine drive unit 1 for propelling the boat. The propulsion components of the boat are an electric motor 5 connected to the drive unit, a battery 17 providing power to the electric motor and an electronic control unit 16 that will control the rotational speed and the rotational direction of the electric motor. The electronic control unit is controlled from a boat control system. In the shown example, a sailboat comprising a single drive unit is shown.

Figure 2:
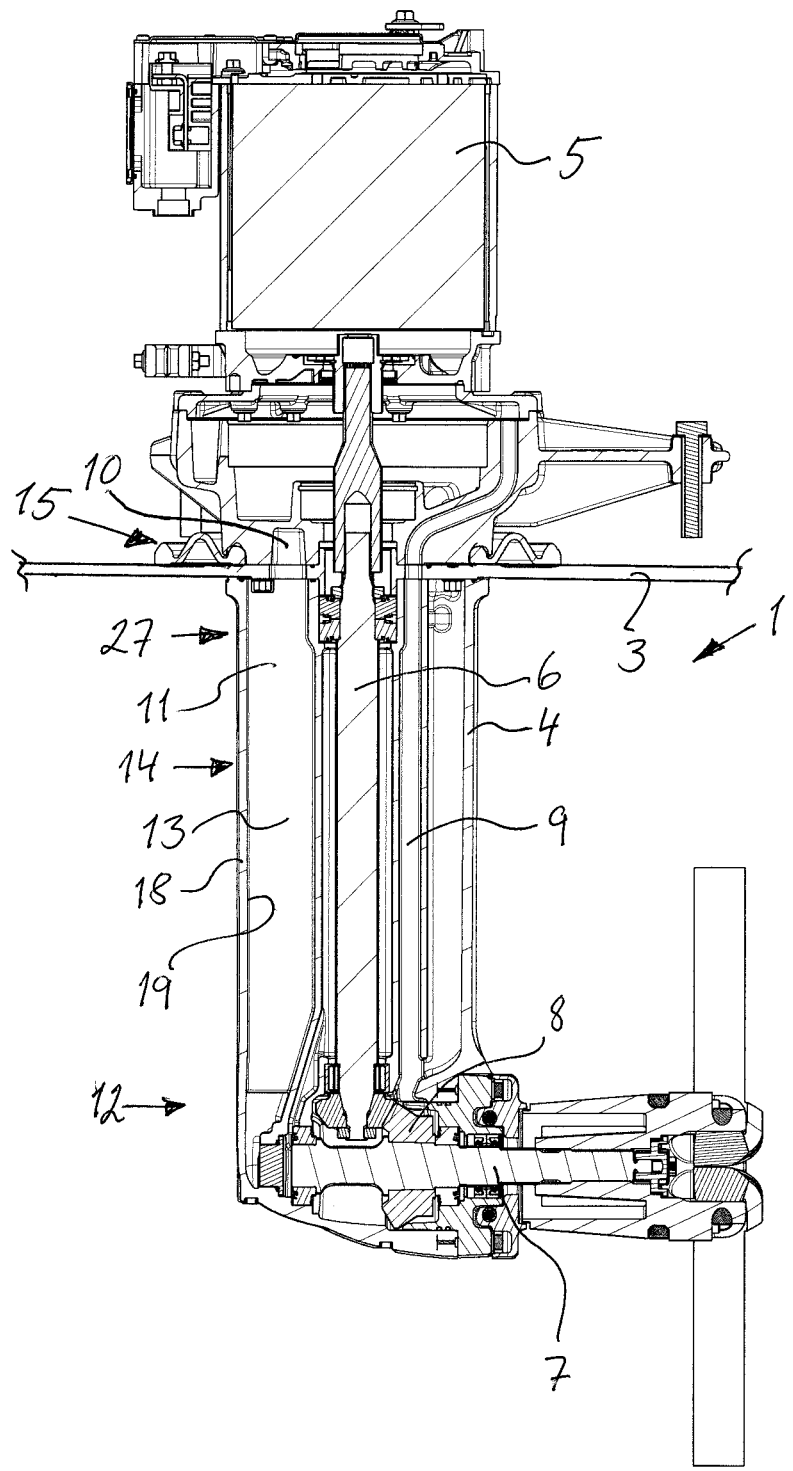
FIG. 2 shows a cut side view of the drive unit.

The boat 30 may be a sailboat or a smaller motorboat. The drive unit is mounted on the bottom of the boat, through the hull 3. FIG. 2 shows an example of a drive unit 1. The drive unit 1 comprises a drive unit body 4 and resembles an ordinary drive unit powered by a combustion engine. The body comprises a drive shaft 6, a propeller shaft 7, a transmission 8 and an oil channel 9.

The drive unit further comprises a closed cooling compartment 13 arranged in the forward part of the body, i.e. the part of the drive unit that is directed in the driving direction of the boat. The closed cooling compartment forms part of a closed cooling circuit 2 of the boat. The cooling circuit includes one or more of the propulsion components and the cooling compartment. The cooling circuit may also comprise an expansion reservoir provided with a controllable valve, adapted to regulate the flow through the cooling circuit.

The cooling compartment 13 comprises an inlet opening 10, an inlet channel 11, a lower end 12, an outlet channel 14 and an outlet opening 15 (not shown). The inlet opening 10 and the outlet opening 15 are arranged at the upper end 27 of the body, at the plane where the drive unit is attached to the hull. The inlet opening 10 is e.g. a circular sleeve extending from the body 4 to which a tubing or the like can be attached. The outlet opening 15 is e.g. a circular sleeve extending from the body 4 to which a tubing or the like can be attached. A circular sleeve may be straight or may be angled. The inlet opening receives cooling fluid from the cooling system of the boat through a tubing, and the outlet opening forwards the cooled down cooling fluid back to the cooling system through another tubing. The inlet channel 11 forms a first flow path 23 for the cooling fluid from the inlet opening 10 to the lower end 12 of the cooling compartment 13. The outlet channel 14 forms a second flow path 24 for the cooling fluid from the lower end 12 of the cooling compartment 13 to the outlet opening 15.

The cooling fluid flows through the first flow path and the second flow path and will dissipate heat through the outer wall 18 of the drive unit 1 to the surrounding seawater. One advantage of the inventive drive unit is that when the boat travels faster and more power is used, more water will flow by the drive unit, which will increase the cooling capacity.

The inlet channel 11 is in one example formed by a separate tube extending from the inlet opening 10 to the lower end 12 of the closed cooling compartment 13, arranged to feed a cooling liquid to the lower end of the cooling compartment. From the lower end 12, the cooling liquid will flow upwards through the closed cooling compartment, which will form the outlet channel 14, to the outlet opening 15.

The inlet channel and the outlet channel may also be formed by an inner wall 21. In this example, the inlet channel is formed between the inner wall and part of the inner side of the body, and the outlet channel is formed between the inner wall and part of the inner side of the body. In this example, the internal wall replaces the separate tube. The inner wall 21 extends to the lower end 12 of the closed cooling compartment 13 where an open space connects the inlet channel 11 to the outlet channel 14.

Figure 3:
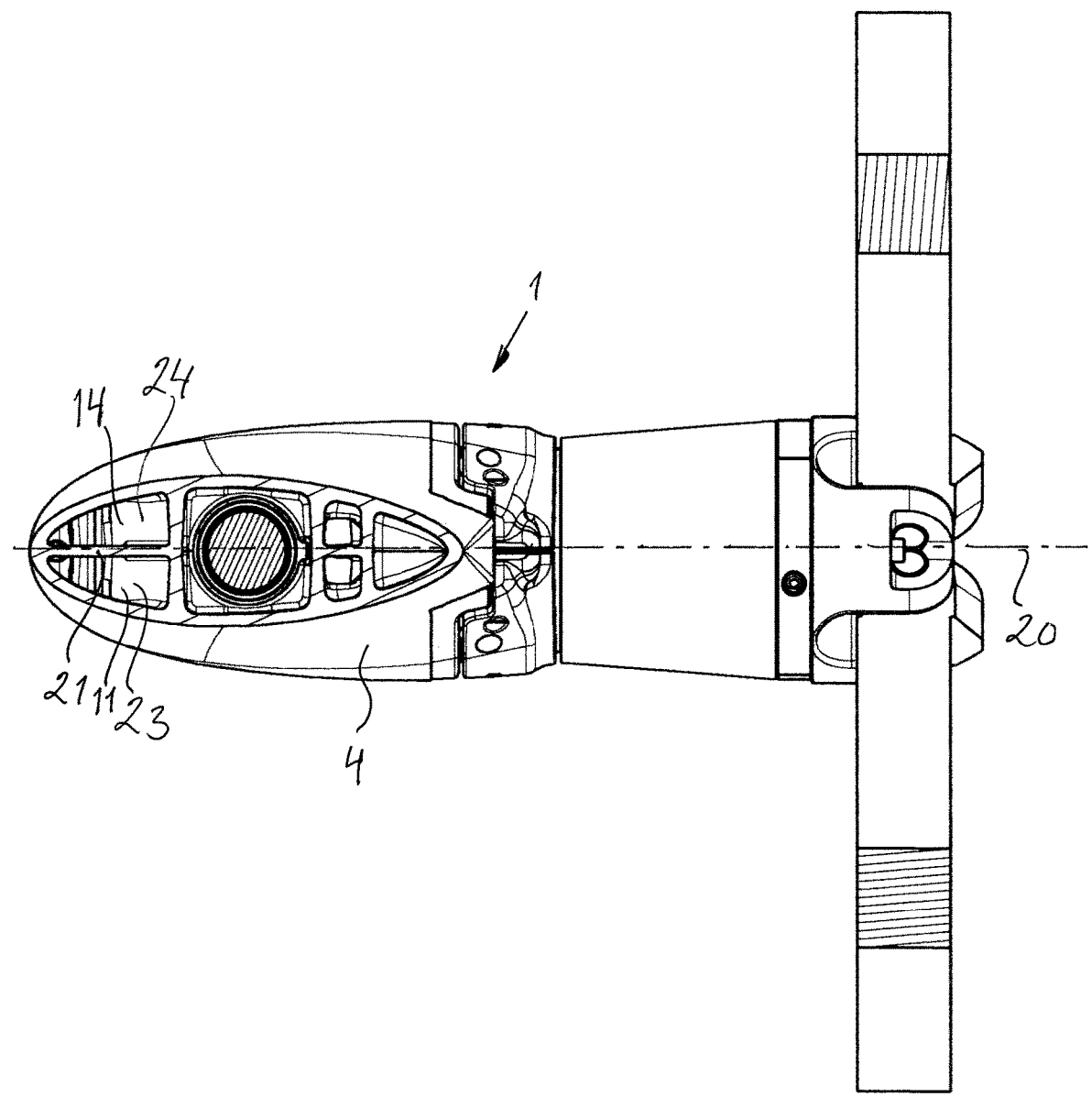
FIG. 3 shows a cut transverse view of a first example of the drive unit.

FIG. 3 shows a first example of a drive unit 1. In this example, the cooling compartment 13 is provided with a first inner wall 21 dividing the cooling compartment in the inlet channel 11 and the outlet channel 14. In the shown example, the inner wall is central in the closed cooling compartment and is parallel with the centre plane 20 of the drive unit. The centre plane is directed in the travel direction of the boat. The cooling fluid flows down through the inlet channel 11 from the inlet opening 10 to the lower end 12 of the cooling compartment. From the lower end 12 of the cooling compartment, the cooling fluid flows upwards through the outlet channel 14 to the outlet opening 15 and further to the cooling system of the boat. The cross section of the inlet channel 11 and the outlet channel 14 may be the same, or may differ. In one example, the cross section of the inlet channel is smaller than the outlet channel. It is also possible to position the first inner wall 21 in a cross direction, perpendicular to the centre plane 20 of the drive unit. In this case, the flow paths will not be arranged side by side, but one flow path will be arranged in front of the other.

Figure 4:
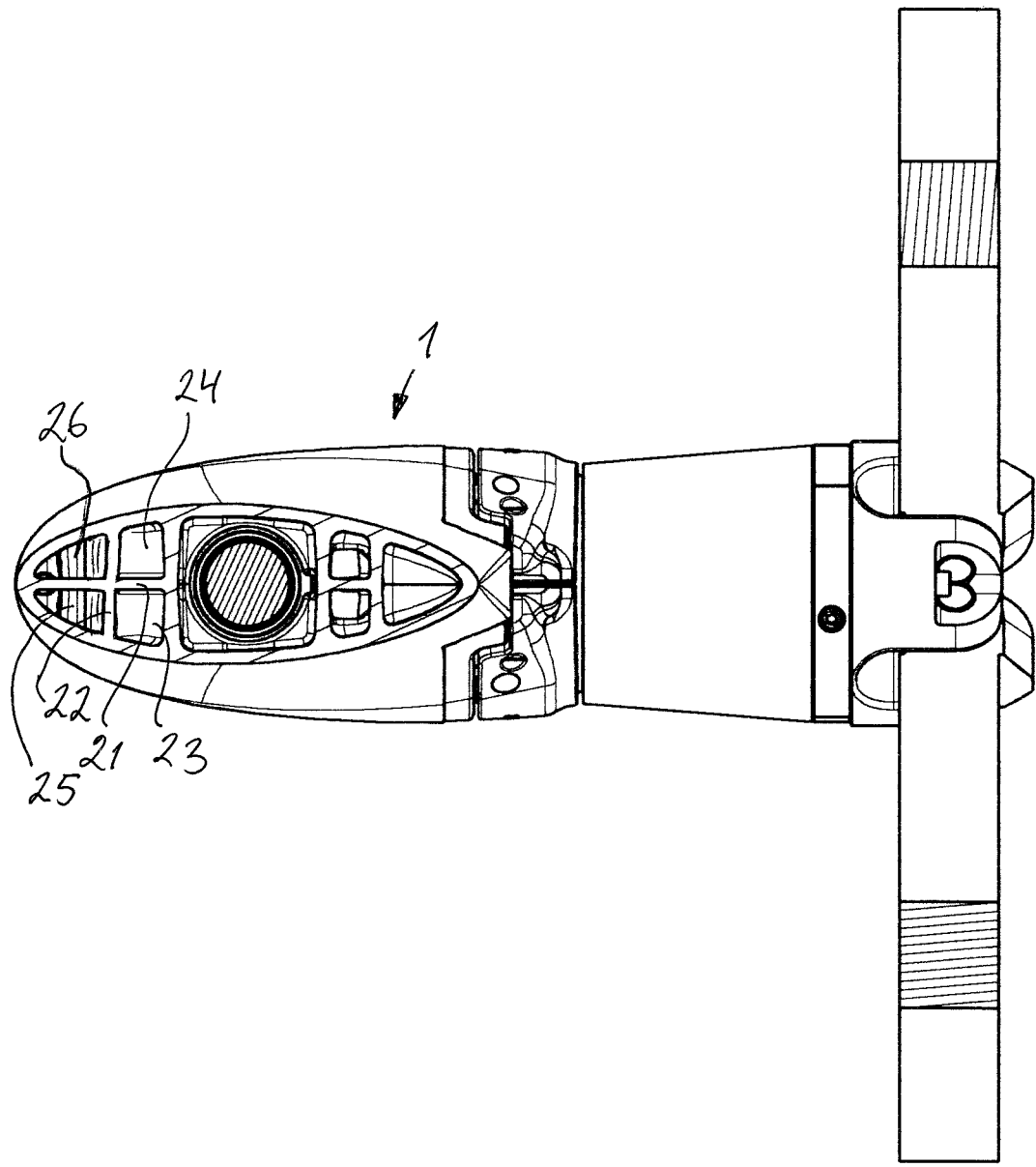
FIG. 4 shows a cut transverse view of a second example of the drive unit.

In another example, shown in FIG. 4, the cooling compartment is also provided with a second inner wall 22, such that the cooling compartment comprises four flow paths. In this example, the cooling fluid will flow down to the lower end 12 of the cooling compartment through the first flow path 23. At the lower end of the cooling compartment, the first flow path 23 is connected to the second flow path 24 such that the cooling fluid will flow upwards to the upper end 27 of the cooling compartment. At the upper end, the second flow path 24 is connected to the third flow path 25, through which the cooling fluid will flow downwards to the lower end of the cooling compartment again. At the lower end 12 of the cooling compartment, the third flow path 25 is connected to the fourth flow path 26 such that the cooling fluid flows upwards towards the upper end of the cooling compartment and to the outlet opening and further to the cooling system of the boat. In this way, a continuous flow path for the cooling fluid is created from the inlet opening 10 to the outlet opening 15.

Figure 5:
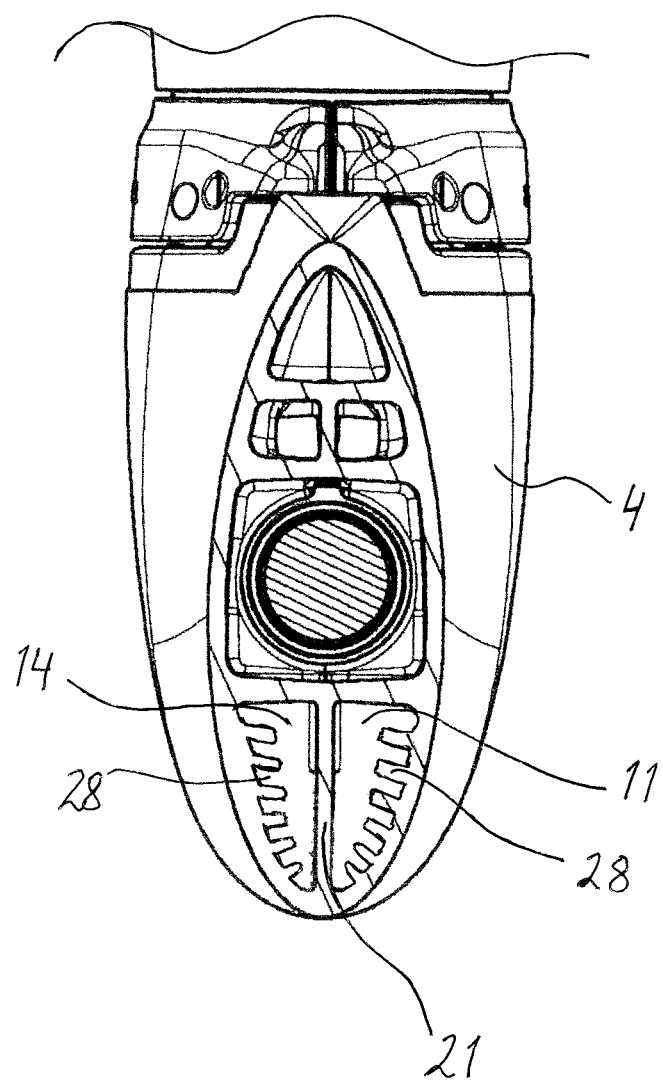
FIG. 5 shows a cut view of a closed cooling compartment.

FIG. 5 shows a cut view of an example of a closed cooling compartment where the inner side 19 of the body is provided with protruding elements 28 that extends into the flow path of the inlet and/or outlet channel. The protruding element is in the shown example longitudinal fins arranged along the flow direction of the cooling fluid. The fins will enlarge the cooling surface of the flow paths. When the inner wall divides the cooling compartment in a longitudinal direction along the centre plane, fins may be provided in both the inlet channel and the outlet channel. When the inner wall divides the cooling compartment in a cross direction, perpendicular to the centre plane, fins may be provided only in the forward channel having a larger contact surface to the surrounding water. The protruding elements may also be elements arranged to disturb the laminar flow of the cooling fluid, e.g. protruding buttons or a chevron pattern, such that the heat exchange through the outer wall is increased.

The boat may be provided with a single drive unit, or may comprise two drive units arranged side by side on the hull.

The drive unit may be fixedly attached to the hull, or may be rotatably attached to the hull, such that the drive unit can be used to help with the steering of the boat.

The method is preferably performed when the boat is propelled by the electric motor and when there is a need to cool the cooling fluid. It is also possible to let cooling fluid flow through the cooling compartment when the boat is standing still, e.g. to pre-cool the electric motor or to cool the electric motor down after it has stopped.

Figure 6:
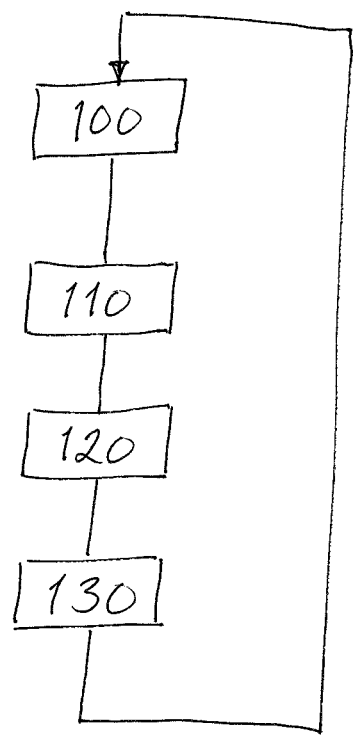
FIG. 6 shows a schematic flow chart of the inventive method.

FIG. 6 shows a schematic flow chart of the method for cooling electric propulsion components of a marine boat, where the marine boat comprises at least one drive unit arranged on the bottom of the boat. The drive unit comprises a closed cooling compartment.

In step 100, the cooling liquid is fed through the propulsion components by the cooling system of the boat, thereby cooling the propulsion components. This may be the electric engine, the battery and/or the electronic control unit.

In steps 110, the cooling liquid is fed through the inlet opening of the drive unit, and downwards through the inlet channel of the closed cooling compartment to the lower end of the closed cooling compartment. By dividing the closed cooling compartment in two separate flow paths, it is ensured that the flow path for the cooling fluid will be as long as possible through the closed cooling compartment. This will enhance the cooling capacity of the closed cooling compartment. When the cooling fluid flows downwards, heat will dissipate from the cooling liquid to water surrounding the drive unit through the outer wall of the body.

In step 120, the cooling liquid is fed upwards through the outlet channel of the closed cooling compartment to the outlet opening of the drive unit. Heat will dissipate from the cooling liquid to water surrounding the drive unit through the outer wall of the body also when the cooling fluid flows upwards.

In step 130, the cooling liquid is fed back to the cooling system and the propulsion components, and the method continues.

The invention is not to be regarded as being limited to the embodiments described above, a number of additional variants and modifications being possible within the scope of the subsequent patent claims.

The invention claimed is:

1. A drive unit for a marine boat comprising a closed cooling compartment arranged in a drive unit body, where the closed cooling compartment forms part of a closed cooling circuit, where the closed cooling circuit is arranged to cool propulsion components of the marine boat, where the closed cooling compartment comprises an inlet opening, an inlet channel, a lower end, an outlet channel and an outlet opening, where the inlet channel forms a first flow path for a cooling fluid from the inlet opening to the lower end of the closed cooling compartment, and where the outlet channel forms a second flow path for the cooling fluid from the lower end of the closed cooling compartment to the outlet opening, thereby allowing heat from the cooling fluid to dissipate through an outer wall of the drive unit, wherein the inlet channel is formed by a separate tube extending from the inlet opening to the lower end of the closed cooling compartment, arranged to feed a cooling liquid to the lower end of the closed cooling compartment.

2. The drive unit according to claim 1, wherein the inlet channel is a single channel extending from the inlet opening to the lower end of the closed cooling compartment, and the outlet channel is a single channel extending from the lower end of the closed cooling compartment to the outlet opening.

3. The drive unit according to claim 1, wherein an inner side of the outer wall is provided with protruding elements.

4. The drive unit according to claim 3, wherein the protruding elements are longitudinal fins.

5. The drive unit according to claim 3, wherein the protruding elements are flow-distributing protrusions.

6. The drive unit according to claim 1, wherein the propulsion components include an electric motor, a battery and/or an electronic control unit.

7. The drive unit according to claim 1, wherein the drive unit is fixedly attached to the hull.

8. A method for cooling electric propulsion components of a marine boat, where the marine boat comprises at least one drive unit arranged on the bottom of the boat, where the drive unit comprises a closed cooling compartment comprising a separate tube extending from the inlet opening to the lower end of the closed cooling compartment, arranged to feed a cooling liquid to the lower end of the closed cooling compartment, comprising the following steps:

feeding a cooling liquid through the propulsion components, thereby cooling the propulsion components, feeding the cooling liquid through an inlet opening, and downwards through the inlet channel of the closed cooling compartment to a lower end of the closed cooling compartment, feeding the cooling liquid upwards through the outlet channel of the closed cooling compartment to an outlet opening, thereby dissipating heat from the cooling liquid to water surrounding the drive unit, and feeding the cooling liquid back to the propulsion components.

9. A boat, comprising the marine drive unit according to claim 1.

* * * * *